UNITED STATES PATENT OFFICE.

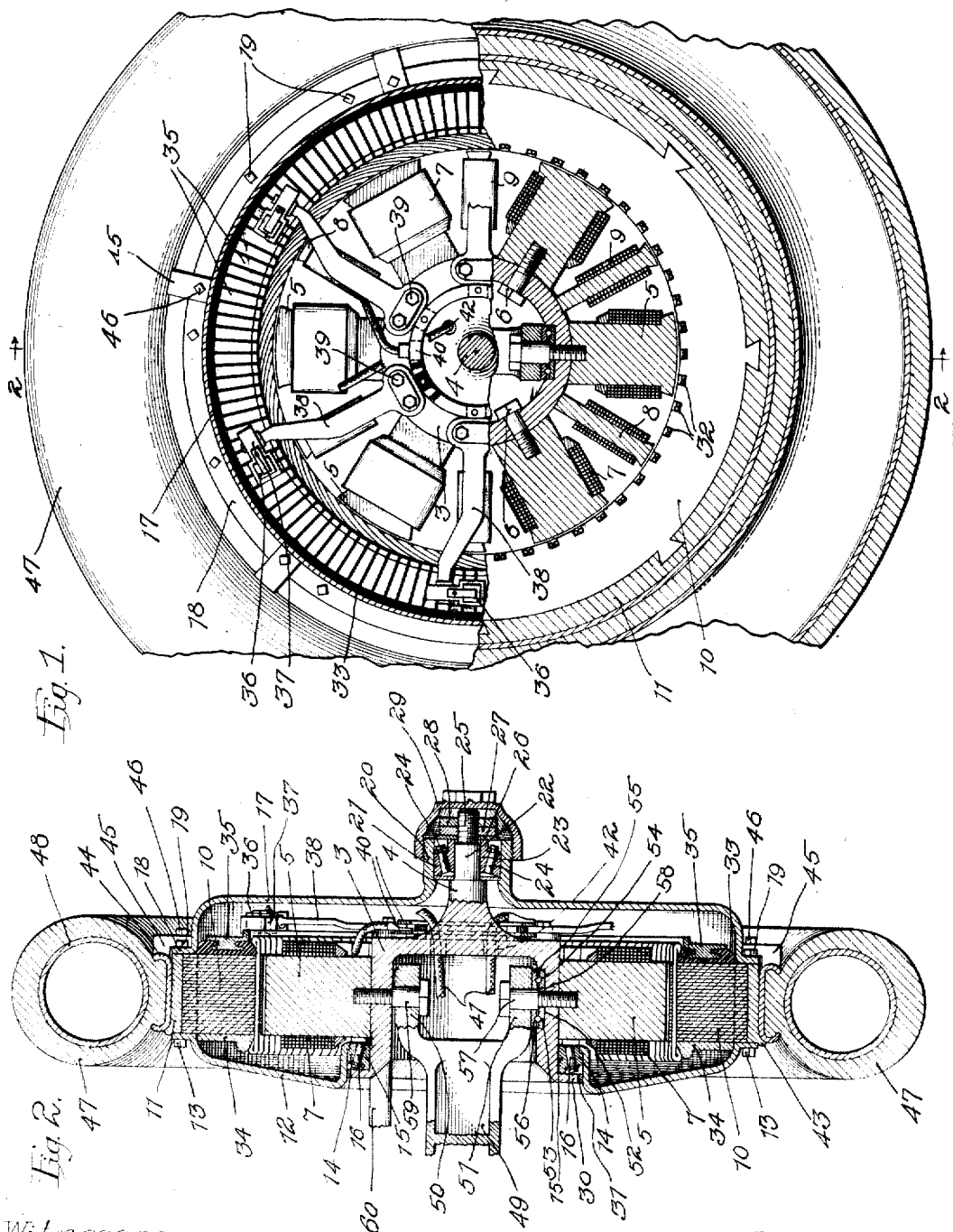
J. McL. KINGSBURY.
ELECTRIC VEHICLE WHEEL.
APPLICATION FILED MAR. 8, 1915.
1,270,527.
Patented June 25, 1918.
Witnesses:
Ernest W. Rapalee
Gilbert C. Samuelsen
Inventor,
J. McLean Kingsbury
By Brown, Hanson & Boettcher
Att'ys

JOHN McLEAN KINGSBURY, OF GREAT FALLS, MONTANA, ASSIGNOR TO KINGSBURY GAS-ELECTRIC MOTOR-CAR COMPANY, OF GREAT FALLS, MONTANA, A CORPORATION OF MONTANA.

ELECTRIC-VEHICLE WHEEL.

1,270,527.   Specification of Letters Patent.   Patented June 25, 1918.

Application filed March 8, 1915. Serial No. 13,041.

*To all whom it may concern:*

Be it known that I, JOHN MCLEAN KINGSBURY, a citizen of the United States, residing at Great Falls, in the county of Cascade and State of Montana, have invented a certain new and useful Improvement in Electric-Vehicle Wheels, of which the following is a full, clear, concise, and exact description, reference being had to the accompanying drawings, forming a part of this specification.

My invention relates to self-propelled vehicles, particularly electric vehicles, and has to do specifically with the wheel or wheels thereof.

My invention provides certain improvements to the end of a generally improved structure and contemplates novel features respecting the support of the wheel, the bearings thereof, the protection of the operating parts thereof, and the arrangement of the parts for the purposes of compactness, simplicity, and accessibility.

My invention is illustrated in the accompanying drawings in which—

Figure 1 is a side elevational view of the wheel, parts being broken away and shown in section in order to clearly reveal the interior construction, and Fig. 2 is a cross-sectional view taken on the plane of the line 2, 2, of Fig. 1 and looking in the direction indicated by the arrows.

It will be seen that I provide a drum portion 3 which is made hollow, opening toward the body of the car, for a purpose to be described presently. Preferably cast integrally with this main hollow portion of the drum is a stud 4 extending axially and outwardly from the portion 3, as clearly shown in the Fig. 2. Mounted radially upon the periphery of the part 3 are a plurality of field pole pieces 5, 5, these pole pieces being secured to the hub 3 by means of screw bolts 6, 6, extending from the inside of the drum, through the rim thereof and into the pole pieces, as illustrated. In the particular instance shown, six pole pieces are provided, and each of the pole pieces is provided with a field winding 7. Alternately between the poles, which have just been described, I provide interpoles 8, 8, which are secured in any suitable fashion to the drum 3 and which are provided with windings 9, 9.

The armature surrounds the field. The armature core is preferably laminated, as illustrated at 10, 10, these laminations being suitably supported in a supporting ring 11. I have illustrated the laminations as being supported by dove-tails in the supporting ring, but it will be understood that any suitable means may be employed. Suitable bolts may be provided to securely clamp the laminations together. In the particular device which I illustrate and which is the preferred embodiment of my invention, I clamp the laminations together by a means now to be described.

I shall now describe the means whereby the supporting ring 11 is supported from the drum. On the inside of the wheel, that is the side which faces the car body, I provide the protecting and supporting plate or shield 12, which is circular in form and which corresponds in size to the supporting ring 11, so that cap bolts 13, 13, may be provided to secure this shield or plate firmly to the ring. On the other hand, these may be through bolts, coöperating with nuts on the other side of the ring so as to simultaneously clamp the inner shield or plate and the outer shield or plate, to which I shall presently refer, to the supporting ring. The plate or shield 12 is formed so as to properly inclose the motor parts, and, as illustrated, it is in the form of a flat ring upon the inner circle of which a hard bearing ring 14 is firmly secured. This ring 14 coöperates with a hard bearing ring 15 appropriately set upon the drum 3 and roller parts 16, 16, are provided so as to form a roller bearing between these two rings.

The outer protecting and supporting plate 17 is also in the form of a flat ring, suitably fashioned to inclose the motor parts. This ring is also made of a size according to the supporting ring 11 and the flange 18 thereof is clamped to the ring 13 by means of the cap bolts 19, or, if desired, this flange may be clamped under nuts if the bolts 13, 13, are through bolts. The interior circle of the plate or shield 17 is provided with the outwardly extending collar 20 which surrounds the boss 4 which has hereinbefore been referred to. Set inside the collar 20 is the hard bearing ring 21 and set upon the reduced portion 22 of the boss 4 is the hard bearing ring 23, and between these two rings the bearing rolls 24, 24, operate. The stud 4 is further reduced and is threaded, as illustrated at 25, for the reception of a washer 26 and a nut 27 to clamp the parts in place, suitable play being of course provided so that the rotatable unit which has just been described can operate upon the drum, a lock nut 28 being provided to hold the clamping nut in its properly adjusted position. The end of the stud 4 and of the collar 20 is protected by a cap 29 which screws upon the collar 20 in the manner illustrated in Fig. 2.

The interior portion of the plate or shield 12 is dished, as shown in Fig. 2, and the inner end of the drum 3 is provided with the radial flange 30 between which and the interior surface of the dished portion of the shield packing 31 may be disposed. It will now be seen that all the interior parts, some of which have been described and some of which are yet to be described, are inclosed within the supporting ring 11, the plate or shield 12, the plate or shield 17, the cap 29, and the drum 3, thus providing a dust proof and thoroughly protected structure.

The inner face of the laminated armature core 10 is slotted, as illustrated at 32, 32, for the reception of the armature windings, which are laid in these slots in the manner shown. An insulating ring 33 is held upon the side face of the armature core, conveniently by the coöperation of a clamping member 34, and this insulating ring carries the commutator segments 35, 35, which thus form a commutating surface which is flat and engaged by laterally disposed brushes 36, 36, carried in brush frames 37, 37, which in turn are secured upon radial arms 38, 38, extending from the drum 3. The arms 38, 38 are secured to the drum by means of cap screws 39, 39, and are distributed properly around the commutator. The brush arrangement includes the connecting rings 40, 40, and suitable conductors 41, 41, may be led to the motor through openings 42, 42, in the drum 3.

The inner side of the supporting ring 11, is provided with a small flange 43, against which a felly 44, which fits snugly upon the ring 11, may be clamped by means of the clamping members 45, 45 and the clamping screws 46, 46. This felly carries the tire 47, an inner tube 48 being provided therefor.

The axle 49 which extends from the chassis passes into the drum 3 as clearly shown in Fig. 2. Within the drum 3 the end of the axle is bifurcated, forming the prongs 50 and 51, the former prong coöperating with the upper portion of the drum and the latter prong coöperating with the lower portion of the drum, as will be presently described. The lower interior portion of the drum is provided with a pocket 52 in which a hard steel bearing plate 53 is disposed, this bearing plate having a raceway 54 for the ball bearings 55. A hardened steel bearing plate 56, which is provided with a suitable raceway for the ball bearings, is set on top of the balls, as shown in both figures, and the axle rests upon this top plate. A pivot screw 57 passes through an opening in the prong 51 and screws down through the drum 3 and into the corresponding pole piece 5. The pivot portion of this screw 57 is enlarged, as shown, so that the shoulder 58 will engage the top of the lower bearing plate when the screw is screwed completely home. Thus, the screw utilizes itself for two purposes—the provision of a pivot, and second the securing of the pole piece 5 to the drum 3. The enlarged part of the screw 57 is such that there will be ample play for the wheel to swing upon the axle. The upper portion of the drum 3 is provided with a similar pivot screw 59.

It will be noted that the pivot pins 57 and 59 are disposed in axial alinement with each other and that their axes are coincident with the vertical central axis of the wheel as a whole. In this way, in the steering of the automobile, the wheel turns upon its own axis so that a minimum amount of turning movement of the wheel is required to secure any certain turning movement of the automobile as a whole. With the motor in the wheel, in such an arrangement, a structure of maximum simplicity is secured, since the only further connection which is required is a controlling rod 60 which is properly mechanically associated with the steering column. It is apparent also that this structure permits of the shortest possible turn of the automobile as a whole.

I claim as new and desire to secure by Letters Patent:

The improvement herein described, comprising an electric motor wheel, having in combination a radially thin ring member, adapted to receive a wheel tire member on its outer periphery, a laminated ring armature secured to its inner periphery, a stationary field within the armature, bearings secured to the field one at each side, cover plates coöperating with said bearings for rotatably mounting the armature and bolted at their outer edges to said ring member, the cover plates serving to clamp the laminations of the ring armature solidly together and to said ring member, a flat commutator mounted on the ring armature, brushes for engaging the commutator carried by radial arms mounted on the stationary field, the armature, field, commutator, brushes and arms being wholly inclosed by said cover plate.

In witness whereof, I hereunto subscribe my name this 2nd day of March A. D., 1915.

J. McLEAN KINGSBURY.

Witnesses:
EDMUND LINCOLN,
GORDON O. SHAFER.